Feb. 13, 1968     H. A. RASCHKE     3,368,250

HOISTING HOOK SAFETY GATE

Filed Nov. 26, 1965

INVENTOR.
HERBERT A. RASCHKE
BY
Townsend and Townsend
ATTORNEYS

United States Patent Office 3,368,250
Patented Feb. 13, 1968

3,368,250
HOISTING HOOK SAFETY GATE
Herbert A. Raschke, Greenbrae, Calif., assignor to
E. D. Bullard Company, Sausalito, Calif.
Filed Nov. 26, 1965, Ser. No. 509,767
6 Claims. (Cl. 24—241)

ABSTRACT OF THE DISCLOSURE

A safety gate for spanning the throat portion of a hoisting hook including a pair of telescopically-biased members pivotally mounted for spanning engagement with the throat portion of the hook. One of the members includes an outer end defining a concave surface conforming to the configuration of the hook adjacent the throat portion.

---

This invention relates to a gate for a safety hook, which gate acts to maintain a load within the hook until such time as the load is intentionally disengaged from the hook.

The specific embodiment of the safety gate to be described in more detail hereinafter includes a band or bracket mountable on the safety hook body adjacent the throat of the hook, which bracket includes a yoke carrying a shaft for defining a pivotal axis. Mounted for pivotal movement on the axis is a gate which is movable between a position bridging the throat and a position affording substantially unrestricted access through the throat. The gate is formed of two telescopically fitted parts and includes a spring or the like for biasing the two parts outwardly of one another. Consequently, when the gate is in throat bridging position a constant force is exerted by the gate against the edges of the throat so that the gate is held in a firmly closed position at all times.

An object of this invention is to provide a safety gate which can be mounted on existing hooks without necessity for special machining procedures on the hooks. Exemplary of the necessity for such special machining procedures in the prior art is U.S. Patent No. 2,728,967, which patent discloses a gate, satisfactory in its operative and function aspects, but requiring relatively expensive machining procedures to accommodate the hook to the gate. By way of contrast, the present invention provides a gate that can be mounted on virtually any safety hook by use of a simple clamp structure.

Another object of the present invention is to provide a safety gate which when disposed in the throat of a safety hook exerts a constant pressure against the portions of the hook that define the hook throat. Consequently, the security with which the gate of the present invention retains a load within the basket of the hook is enhanced.

Still another object of the present invention is to provide a safety gate which when moved to the open position for permitting insertion or removal of the load from the hook basket, is substantially totally removed from the throat portion of the hook so that the load can be inserted or removed in a rapid and facile manner.

These and other objects will be more apparent after referring to the following specification and accompanying drawing in which.

Figure 1:
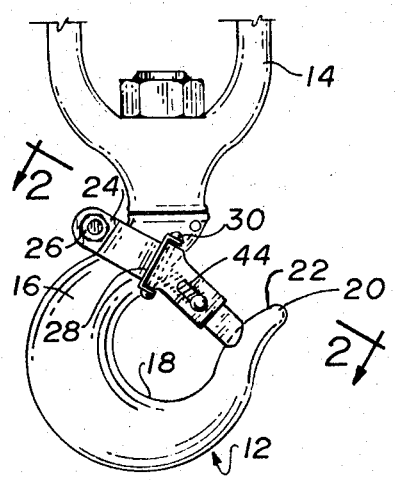
FIG. 1 is a side elevation view of the gate of the present invention in place on a safety hook of conventional form.
Figure 3:
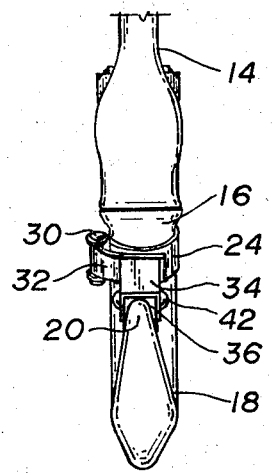
FIG. 3 is a front view of the gate and safety hook of FIG. 1.

Referring more particularly to the drawings, reference numeral 12 generally indicates a safety hook of conventional form, which hook includes an eye or bail, fragmentarily indicated at 14, for permitting attachment of the hook to a hoisting line or the like. The main body of hook 12 below eye 14 includes a heel portion 16 which curves around to define a load supporting basket 18 and terminates at the outer extremity in a tip 20. The region of minimum width between tip 20 and heel 16 is typically referred to as the throat; such terminology will be utilized here, the throat being indicated at 22.

The safety gate of the present invention includes a strap or band 24 mountable in circumscribing relation to heel portion 16 of the hook by means of a threaded fastener or the like 26. Bracket 24 includes a yoke 28 which extends therefrom to a position adjacent throat 22 but does not protrude into the throat to any substantial degree. Yoke 28 carries a shaft 30 on which is pivotally mounted a gate base 32 which is offset from a true radial position with respect to shaft 30 so that the gate can enter throat 22 even though shaft 30 is without the gate. The radial offset, as more clearly shown in FIG. 2, causes the gate when in the open position to reside without throat 22.

Secured to gate base 32 is a hollow sleeve member 34 which defines a portion of the gate and which is here shown as being of generally square cross section. It will be noted that sleeve member 34 has a length greater than half the width of throat 22 but less than the total width of the throat. Telescoped within sleeve member 34 is a gate body member 36 which is concaved at its outer end 38 to generally conform with the surface of tip portion 20 that defines throat 22. Gate body member 36 is biased outwardly of sleeve 34 by a compression spring 40. A cross pin 42 transpierces the inner end of gate body member 36 and follows an elongate slot 44 formed in the wall of sleeve 34, thereby preventing loss or escape of the gate body member.

Figure 2:
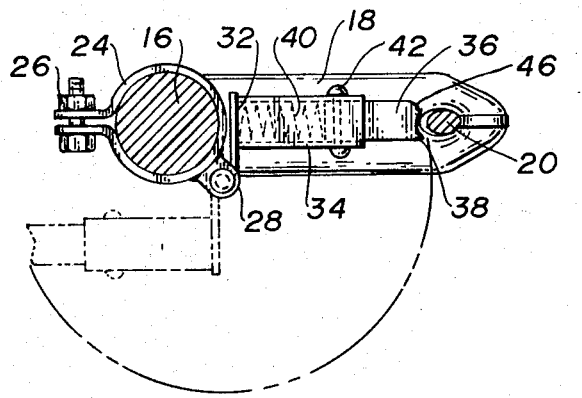
FIG. 2 is a cross-sectional view at enlarged scale of the gate of FIG. 1 taken substantially along line 2—2 of FIG. 1.

For expediting rapid closure of the gate, the leading corner edge of gate body member 36 is sloped or tapered inwardly at 46, see FIG. 2, so that pressure applied to the gate in a counterclockwise direction as viewed in FIG. 2 will effect closure of the gate.

In operation the gate of the present invention is installed onto a hook by passage of band 24 around the heel of the hook and by installation of threaded fastener 26. The band 24 is constructed of material having a slight degree of flexibility so that on tightening the threaded fastener the band will conform or substantially conform to the exterior shape of heel portion 16. When it is desired to close the gate, pressure toward the counterclockwise direction as viewed in FIG. 2 engages concave end portion 38 of the gate with the surface of tip 20 opposite throat 22. In this position the rear face of gate base 32 contacts the surface of band 24 so that the gate totally spans or bridges the throat. The action of spring 40 retains the gate in this position. Consequently, a load within basket 18 will not be dislodged from the hook even should the hoisting line connected to eye 14 become slack and permit the hook to assume an inverted position.

In order to remove the load from the hook finger pressure is applied on the protruding ends of cross pin 42 and gate body 36 is telescoped into gate sleeve 34. The gate can then be swung, in a clockwise direction as viewed in FIG. 2, and the gate moved to a position shown in broken lines in the figure, at which position the hook throat is substantially unrestricted by the gate.

Thus it will be seen that the present invention provides a hook safety gate that can be quickly mounted on pre-existing hooks without any modification of the hook

What is claimed is:

1. A safety gate for a hook of the type having a load supporting basket portion and a relatively narrower throat portion, said gate comprising first and second gate body members, said first gate body member having a concavity formed in a first end thereof for engaging the tip of the hook adjacent the throat, said second gate body member being formed with a central opening for telescopically receiving said first gate body member, means for resiliently biasing said first gate body member outwardly of said second gate body member in spanning relation to said throat portion to cause said first end to engage said hook, means secured to said second gate body member at the end thereof remote from said first gate body member for mounting said gate for pivotal movement about an axis between a throat bridging position and a throat clearing position, said mounting means being so constructed that the axis of pivotal movement is generally normal to said throat portion and exterior thereof.

2. A gate according to claim 1, wherein said gate mounting means comprises a base member secured to said second gate body member, said base member having a lateral extension which has on the edge thereof remote from said second gate body member a curved portion projecting from said face in a direction opposite said first gate body member, and means for supporting said base member along the outer edge of said lateral extension for pivotal movement between a throat bridging position and a throat clearing position.

3. A gate according to claim 2, wherein said base supporting means comprises a generally cylindrical band for embracing the body of said hook opposite the throat portion thereof, means for securing said band in embracing relation around the hook body, said band including a yoke thereon exterior of said throat, a shaft carried on said yoke for defining an axis generally normal to said throat, and means on said base for engagement with said shaft to afford pivotal movement of said gate.

4. A safety gate for a hook of the type having a curved portion defining a load supporting basket and a heel portion and tip confronting one another to define a throat relatively narrower than said basket, said gate comprising a generally cylindrical band for embracing said heel portion, means for securing said band in embracing relation to said heel portion, said band including a yoke thereon exterior of said throat, a shaft carried on said yoke for defining an axis generally normal to said throat, a gate sleeve member mounted on said shaft for pivotal movement between a position within said throat and a position exterior said throat, said sleeve having a central bore opening at the end thereof remote from said shaft, a gate body mounted in said bore for telescopic movement relative said sleeve, said gate body having a depression on the free end thereof for engaging said hook body at about said tip, and means for resiliently biasing said body outwardly of said sleeve.

5. The gate according to claim 4 wherein said sleeve includes a pair of slots opposite one another across said bore, said slots being elongated along the longitudinal axis of said sleeve, a pin transpiercing said gate body and having opposite ends thereof extending through said slots exterior of said sleeve to afford a grip for telescoping said gate body into said sleeve.

6. A safety gate for a hook of the type having a load supporting basket portion and a relatively narrower throat portion, said gate comprising a gate body having first and second members mounted for relatively telescoping movement, means for resiliently biasing said first and second members telescopically outwardly of one another in spanning relation to said throat portion, said first member having on the outer end thereof a concavity for engaging the tip of the hook adjacent the throat, and means secured to said second member adjacent the outer end thereof for mounting said gate body for pivotal movement about an axis between a throat bridging position and a throat clearing position, said mounting means being so constructed that the axis of pivotal movement is generally normal to said throat portion and exterior thereof.

References Cited

UNITED STATES PATENTS

| 1,046,795 | 12/1912 | Johnson | 24—241 |
| 3,003,214 | 10/1961 | Geraghty | 24—241 |

FOREIGN PATENTS

| 178,100 | 1917 | Canada. |
| 177,993 | 9/1935 | Switzerland. |

DONALD A GRIFFIN, *Primary Examiner.*